April 7, 1942.  E. U. CONDON  2,278,510
SENSITIVE DEVICE FOR MEASURING LINEAR DENSITY OF WIRE
Filed July 26, 1939
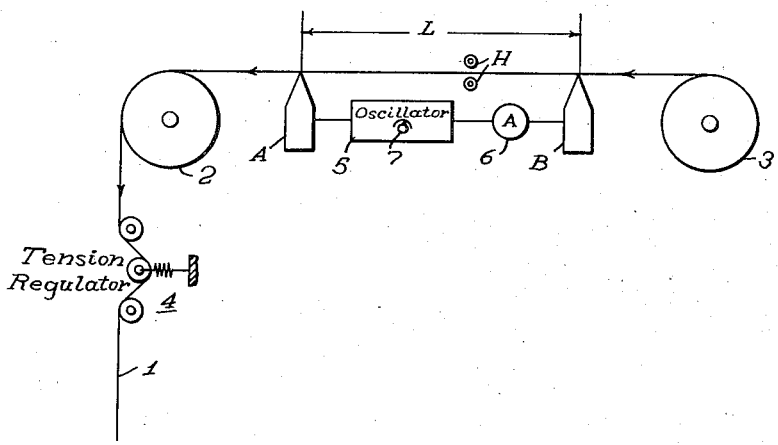
WITNESSES:
INVENTOR
*Edward U. Condon.*
BY
ATTORNEY Patented Apr. 7, 1942

2,278,510

UNITED STATES PATENT OFFICE 2,278,510

SENSITIVE DEVICE FOR MEASURING LINEAR DENSITY OF WIRE

Edward U. Condon, Edgewood, Pa., assignor to Westinghouse Electric & Manufacturing Company, East Pittsburgh, Pa., a corporation of Pennsylvania Application July 26, 1939, Serial No. 286,629

5 Claims. (Cl. 73—51)

My invention relates to an apparatus and method for determining the mass per unit length of a continuously moving wire.

An object of my invention is to provide a highly sensitive device for measuring the mass per unit length of a wire while said wire is in motion during either a wire drawing process, a winding process, or any other similar process which involves continuous motion of the wire.

Another object of my invention is to provide a completely electrical, sensitive device for measuring the density of the wire, which device is simple, inexpensive, yet highly precise.

Other objects and advantages will become more apparent from a study of the following specification when considered in conjunction with the accompanying drawing, in which:

The single figure shows a wire 1 which is being unwound from reel 2 onto reel 3. A tension regulator which is shown schematically by numeral 4 is provided for maintaining a substantially constant tension T in wire 1. This tension regulator 4 may be one of any of a number of well known types. For example, it may be a differential mechanism which is operable by the relative speeds of reels 2 and 3, or, in fact, any other of the well known tension regulating devices. Hence, it is deemed that a detailed description of such tension regulator is unnecessary, since it in itself forms no part of my invention.

A pair of edged supports A and B, spaced a readily measurable distance, as L, from each other are provided for the movable wire 1. At right angles to the length L of the wire there is provided a permanent magnetic field, indicated by letter H. Such field may be provided by a permanent magnet or any other similar device. Field H, as shown, is in a direction emanating from the plane of the drawing, that is, outwardly towards the reader. A source of alternating current adapted to have any selected frequency, and generally indicated by the rectangle 5 is connected to the supports A and B. An ammeter 6 is electrically connected in series with the source of supply, the circuit thus being completed through the length L of wire 1 through supports A and B.

The operation of the device is as follows:

Inasmuch as the source 5 passes an alternating current through length L of wire 1, and since the length L of wire 1 is in the field H of a permanent magnet, sustained oscillation or vibration of the length L of wire 1 will occur, said vibration having a frequency which corresponds to that of the alternating current furnished by the oscillator 5. A more detailed analysis of the reason for the vibration of the wire may be made by assuming a particular half cycle of the alternating current wave, say that during which the current is traveling from support B through the wire 1 to support A. In accordance with the well known Fleming "left-hand" rule for motors, a force will be applied to the wire 1 in an upward direction. In the next half cycle when the current is reversed and moves from support A to support B, the motion of wire 1 will be in a downward direction. Hence, it will be seen that a sustained oscillation of a given length of wire will be produced by the alternating current and which oscillation is of a frequency equal to that of the alternating current.

As the wire vibrates, its motion in the magnetic field H induces a back electromotive force in the wire which back electromotive force is proportional to the velocity of movement or amplitude of vibration of the wire. The frequency of the source 5 may be changed by turning a suitable knob 7, which may be any one of a number of well known control means for varying the frequency of the source of alternating current.

As the frequency of the source 5 approaches the natural or resonance frequency of the particular length of the wire included between the supports A and B, the amplitude of vibration becomes more pronounced. The induced back electromotive force becomes greater. Finally, when the frequency of the source 5 coincides with the natural resonance frequency of the wire of length L, a maximum amplitude of vibration is attained, and a maximum back electromotive force is induced in the wire. This resonance frequency is best detected by observing the reading of ammeter 6. At resonance a very abrupt change in the reading of ammeter 6 will take place. Under certain conditions and with certain constants in the system, for example, the ammeter will detect a sudden decrease in current or sudden minimum value at resonance due to the fact that the induced back electromotive force is always in a direction in opposition to the alternating current furnished by source 5.

After the resonance frequency $f_r$ has been ascertained, either by reading the calibrated scale on knob 7 or by the use of any suitable frequency meter, the mass per unit length $e$ may be determined from the formula:

$$f = \frac{1}{2L}\sqrt{\frac{T}{e}}$$

In this manner, it will be readily seen that the mass per unit length may be continuously observed without stopping the wire drawing or winding process if the tension regulation is sufficiently accurate, or, in any case, without having to cut out a sample of the wire, even if it is found necessary to stop the machine to get more accurate tension control. If the mass per unit length or density of the wire is above or below a selected or optimum value, this fact will be readily noted and the wire drawing process, or other process, may be corrected either manually or automatically by any suitable well known control device.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. Apparatus for measuring the mass per unit length of a continuously moving wire while it is in motion which comprises means for maintaining said wire under substantially constant known tension, a pair of spaced supporting members for said wire in continuous sliding contact therewith and so spaced as to select a particular known length thereof, variable frequency electrical means for effecting sustained vibration of said wire and which is adjustable to a frequency which corresponds to the natural resonance frequency of said length of wire whereby the mass per unit length of said wire may be calculated from the characteristics present under the aforesaid resonance condition.

2. Apparatus for measuring the mass per unit length of a wire which comprises means for maintaining said wire under substantially constant known tension, a pair of supporting members for said wire disposed to select a particular known length thereof which corresponds to the distance between said members, means for producing a permanent magnetic field at right angles to said length of wire, means for generating an alternating current in said length of wire thereby effecting sustained vibration thereof at a frequency corresponding to that of the alternating current, means for varying the frequency of said alternating current until it corresponds to the natural resonance frequency of said length of wire and electrical means for determining the attainment of said natural resonance frequency whereby the mass per unit length of said wire may be calculated from the constants occurring at such resonance condition.

3. Apparatus for measuring the mass per unit length of a continuously moving wire while it is in motion which comprises means for maintaining said wire under substantially constant tension, a pair of supporting members for said wire in sliding contact therewith and disposed to select a particular known length thereof which corresponds to the distance between said members, means for producing a permanent magnetic field at right angles to said length of wire, means for generating an alternating current in said length of wire thereby effecting sustained vibration thereof at a frequency corresponding to that of the alternating current, means for varying the frequency of said alternating current until it corresponds to the natural resonance frequency of said length of wire, and electrical means for determining the attainment of said natural resonance frequency whereby the mass per unit length of said wire may be calculated from the constants occurring at such resonance condition.

4. Apparatus for measuring the mass per unit length of a wire which comprises means for maintaining said wire under substantially constant known tension, a pair of supporting members, said wire disposed to select a particular known length thereof which corresponds to the distance between said members, means for producing a permanent magnetic field at right angles to said length of wire, an alternating current oscillator and an ammeter which are electrically connected in series with said length of wire thereby effecting sustained vibration thereof at a frequency corresponding to that of the alternating current, means for varying the frequency of said alternating current until it corresponds to the natural resonance frequency of said length of wire, said ammeter being indicative of the attainment of said natural frequency by virtue of sudden change in its reading at resonance whereby sufficient constants are known for calculating the weight per unit length of said length of wire.

5. Apparatus for measuring the mass per unit length of a continuously moving wire while it is in motion which comprises means for maintaining said wire under substantially constant known tension, a pair of supporting bridge members for said wire in sliding contact therewith and disposed to select a particular known length thereof which corresponds to the distance between said bridge members, means for producing a permanent magnetic field at right angles to said length of wire, an alternating current oscillator and an ammeter which are electrically connected in series with said length of wire thereby effecting sustained vibration thereof at a frequency corresponding to that of the alternating current, means for varying the frequency of said alternating current until it corresponds to the natural resonance frequency of said length of wire, said ammeter being indicative of the attainment of said natural resonance frequency by virtue of sudden change in its reading at resonance, whereby sufficient constants are known for calculating the weight per unit length of said length of wire.

EDWARD U. CONDON.